J. R. TUFTS.
LOCKER FORMING ATTACHMENT FOR AUTOMOBILES.
APPLICATION FILED NOV. 21, 1916.

1,237,421.

Patented Aug. 21, 1917.
2 SHEETS—SHEET 1.

INVENTOR
J. R. Tufts,

BY Victor J. Evans
ATTORNEY

WITNESSES

J. R. TUFTS.
LOCKER FORMING ATTACHMENT FOR AUTOMOBILES.
APPLICATION FILED NOV. 21, 1916.
1,237,421.
Patented Aug. 21, 1917.
2 SHEETS—SHEET 2.
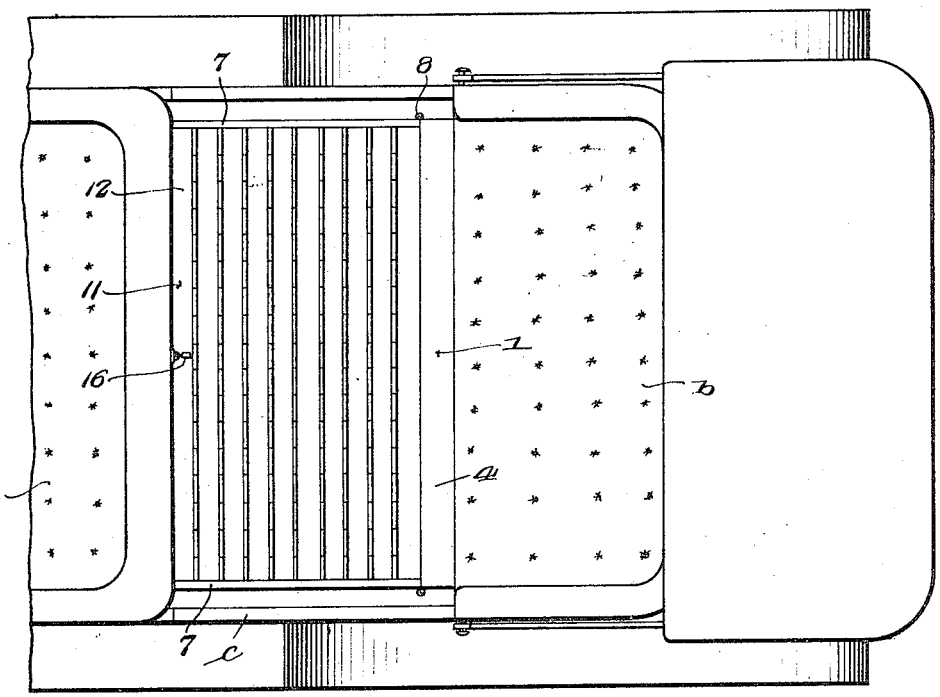
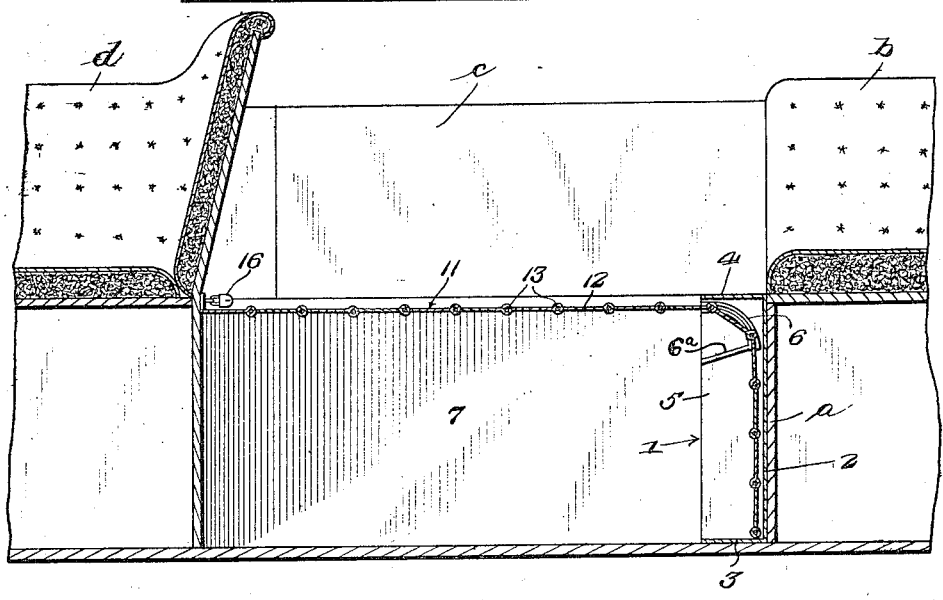
WITNESSES
INVENTOR
J. R. Tufts,
BY Victor J. Evans
ATTORNEY

UNITED STATES PATENT OFFICE.

JOHN R. TUFTS, OF TRENT, SOUTH DAKOTA.

LOCKER-FORMING ATTACHMENT FOR AUTOMOBILES.

1,237,421.     Specification of Letters Patent.     Patented Aug. 21, 1917.

Application filed November 21, 1916. Serial No. 132,651.

*To all whom it may concern:*

Be it known that I, JOHN R. TUFTS, a citizen of the United States, residing at Trent, in the county of Moody and State of South Dakota, have invented new and useful Improvements in Locker-Forming Attachments for Automobiles, of which the following is a specification.

This invention is an improved attachment for automobiles to form a locker between the front and rear seats and the side doors of an automobile at will and thereby provide a safe compartment or locker for the storage of wraps, provisions or other articles when the occupants leave the automobile and the latter is left standing for any length of time, the object of the invention being to provide an improved device of this kind which is simple in construction, which may be readily installed in an automobile and by means of which the space between the front and rear seats of the automobile may be utilized as a safety deposit locker.

The invention consists in the construction, combination and arrangement of devices hereinafter described and claimed.

In the accompanying drawings:

Fig. 3 is a diagrammatic plan of a Ford automobile showing my improved locker forming attachment in place therein.

Fig. 4 is a diagrammatic sectional view of the same.

Figure 1:
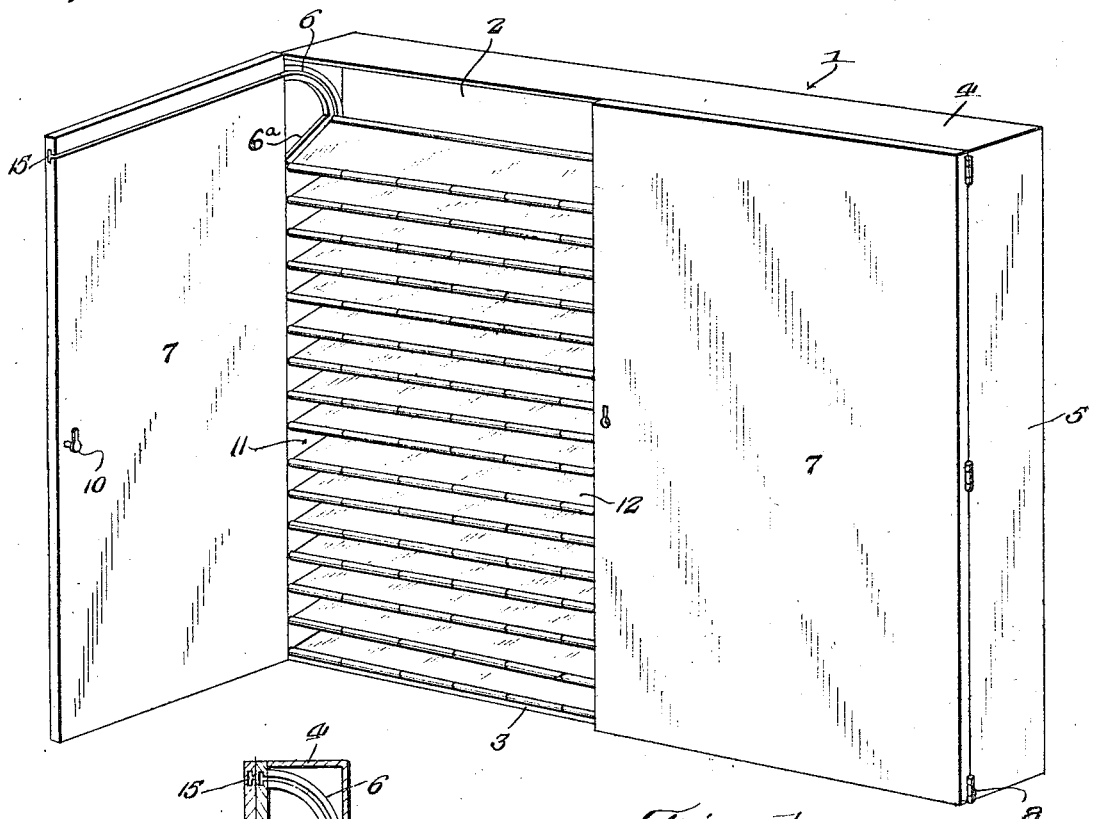
Figure 1 is a perspective view of a locker forming attachment constructed and arranged in accordance with my invention and showing the same partly open.
Figure 2:
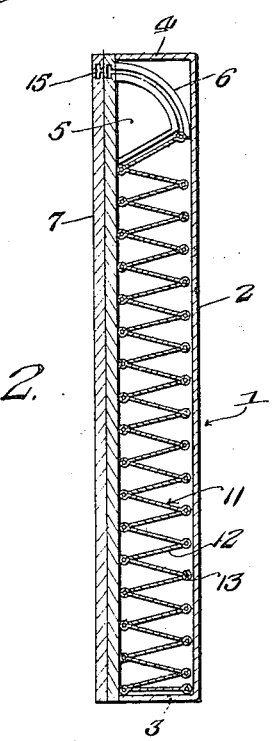
Fig. 2 is a vertical sectional view of the same, closed.
Figure 5:
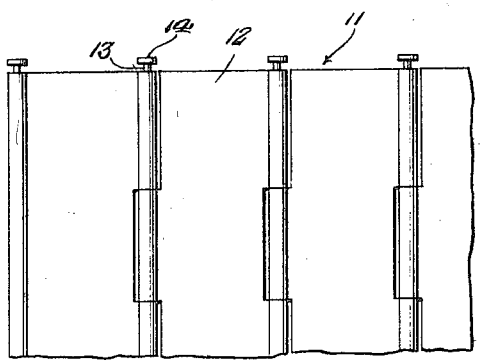
Fig. 5 is a detailed plan of the flexible curtain.

In the embodiment of the invention herein shown a case 1 is provided which is open in the front side and comprises a back 2, bottom 3, top 4, and end walls 5. This case is of suitable dimensions to enable it to be secured on the wall or upright portion *a* of the rear seat *b* of an automobile, and to extend from side to side of the automobile. The end walls 5 of the case are provided with guide grooves 6 which are open at the front and upper sides of said walls and extend downwardly therein. Downwardly and outwardly extending guide members 6ᵃ are here shown as arranged at the lower front sides of the grooves 6. A pair of doors 7 are provided to close the front side of the case 2. The doors are hinged as at 8 to the front edges of the side walls 5 and are of a size and shape enabling them to bear against the inner sides of the doors *c* of the automobile when said doors 7 are opened and to extend from the case forwardly to the rear side of the front automobile seat *d*. When the attachment is constructed for use in a Ford automobile the doors 7 also, when open, bear against the threshholds of the car doors and are prevented by the threshholds from being opened outwardly of the car even when the car dors are opened. The said doors 7 are provided with fastening means 10 to secure them together when in closed position. Any suitable fastening means may be provided for this purpose.

I also provide a flexible curtain 11 to form a top for the space between the front and rear seats of the automobile and to co-act with the doors 7 in utilizing this space as a locker for the storage of wraps, provisions or other articles. The curtain 11 is flexible and is here shown as comprising metal slats or bars 12 which are pivotally connected together at their opposing sides by pintle rods 13. The ends of the rods project beyond the sides of the curtain and are provided with heads 14 to enter and slide in the guide grooves 6 of the end walls of the case and thereby enable the curtain to be pushed back and folded in the case, as will be understood. The doors 7 are provided in their inner sides near their upper edges with horizontally arranged guide grooves 15 which correspond with the grooves 6 and register with the upper ends of said grooves 6 so that when the doors 7 are opened the curtain can be drawn up from the case and the heads of its pintle rods as they leave the guide grooves 6 will run into the guide grooves 15 to enable the curtain to be drawn forwardly until its front end reaches the rear side of the front automobile seat and to co-act with the doors 7 to convert the space between the front and rear automobile seats into a locker. A suitable lock 16 is provided to secure the front end of the curtain to the rear side of the front automobile seat. The grooves 15 co-act with the heads of the pintle rods to firmly connect the sides of the curtain to the doors 7 so that the curtain is effectually secured when in locker forming position.

The back of the case 2 may be secured to the upright or wall under the rear seat of the automobile by screws or other suitable means and the said case may be removed when desired.

I would have it understood that the various parts of my improved locker forming attachment may be made of any suitable material and may be so shaped as to enable the attachment for use in connection with any make of automobile or other vehicle.

Having thus described my invention, what I claim is:

1. A locker forming device of the class described, comprising a case having doors to open and close the front side thereof, said doors and the end walls of the case having communicating guiding means on their inner sides, and a flexible curtain arranged in the case and adapted to be drawn out from the case and between the doors thereof, when said doors are opened, said curtain having means at the sides thereof to slide in the said guiding means, and co-act therewith in slidably securing the curtain between the doors.

2. A locker forming device of the class described comprising a case having hinged doors to open and close the front side thereof, said doors and the end walls of the case having communicating guide grooves on their inner sides, a flexible curtain arranged in the case and adapted to be drawn out therefrom and between the doors thereof when the doors are open, said curtain comprising slats, rods pivotally connecting the slats together and projecting at their ends beyond the sides of the curtain, and heads on the ends of said rods and arranged to slide in said guide grooves.

In testimony whereof I affix my signature.

JOHN R. TUFTS.